United States Patent [19]
Shin

[11] Patent Number: 5,526,895
[45] Date of Patent: Jun. 18, 1996

[54] REAR WHEEL SELF-STEERING SYSTEM FOR VEHICLE

[75] Inventor: Dongwoo Shin, Kyungsangnam-do, Rep. of Korea

[73] Assignee: Hyundai Motor Company, Seoul, Rep. of Korea

[21] Appl. No.: 352,699

[22] Filed: Dec. 1, 1994

[30]     Foreign Application Priority Data

Dec. 10, 1993 [KR]   Rep. of Korea ...................... 93-27195
Dec. 10, 1993 [KR]   Rep. of Korea ...................... 93-27202

[51] Int. Cl.⁶ ................................................. B60K 17/358
[52] U.S. Cl. ......................... 180/236; 180/237; 180/410; 280/81.6; 280/91.1
[58] Field of Search ................................... 180/236, 237, 180/238, 266; 280/81.5, 81.6, 91, 98

[56]         References Cited

U.S. PATENT DOCUMENTS 3,048,422   8/1962   Payne et al. ........................ 280/81.5
3,454,123   7/1969   Lewis ................................... 280/81.5

Primary Examiner—Kenneth R. Rice
Attorney, Agent, or Firm—Birch, Stewart, Kolasch & Birch

[57]          ABSTRACT

The present invention relates a rear wheel self-steering system for a vehicle which can minimize a turning radius of a vehicle and a tire wear by independently steering the rear wheel during cornering. The system includes a side frame, a first spring mounted on a first rear wheel axle below the side frame and having a front end fixed to the side frame, a second spring mounted on a second rear wheel axle below the side frame and having a rear end fixed to the side frame, and a steering control part for controlling a distance between the first and second rear wheel axles in accordance with a vehicle's running state such that when the vehicle is in cornering the first rear wheel axle becomes far away from the second rear wheel axle, the steering system connecting the first and second spring members to each other.

17 Claims, 6 Drawing Sheets

REAR WHEEL SELF-STEERING SYSTEM FOR VEHICLE

BACKGROUND OF THE INVENTION

1. Field of the Invention

The present invention relates to a rear wheel self-steering system for a vehicle and, more particularly, to a system which can minimize a turning radius of the vehicle and tire wear by independently controlling the directional position of the rear wheel during cornering.

2. Description of the Conventional Art

Two rear wheel axles are commonly used on the rear of commercial vehicles, for example heavy trucks, where a high load-carrying capacity is required.

Such vehicles having two rear wheel axles are structurally characterized as a solid leaf spring type which supports the two axles simultaneously and an independent leaf spring type which supports the two axles independently.

However, the vehicle having the two rear wheel axles has disadvantages in that adhesion force between the tire and the ground is large such that turning radius and tire wear are increased.

SUMMARY OF THE INVENTION

Accordingly, the present invention is made in an effort to solve the above-described problems.

It is an object of the present invention to provide a rear wheel self-steering system for a vehicle which can minimize a turning radius of a vehicle and a tire wear by independently controlling the directional position of the rear wheel during cornering.

To achieve the above objects, the present invention provides a rear wheel self steering system for a vehicle, comprising: a side frame; first spring means mounted on a first rear wheel axle below the side frame and having a front end fixed to the side frame; second spring means mounted on a second rear wheel axle below the side frame and having a rear end fixed to the side frame; and steering control means for controlling a distance between the first and second rear wheel axles in accordance with a vehicle's running state such that when the vehicle is cornering, the first rear wheel axle becomes far away from the second rear wheel axle, and the steering means connects the first and second spring means to each other.

The steering control means comprises: a steering member, on which a rear end of the first spring means and a front end of the second spring means are connected, for receiving an expandable force of the first and second spring means which occurs when a vehicle body on an outer side of a turn lowers during cornering, said steering member being rotatably fixed to a bracket mounted on the side frame; an actuator for controlling a rotation of the steering member in accordance with the vehicle's running condition; and an electronic control unit for receiving a signal from a vehicle speed sensor and a steering sensor and outputting an electric signal for selectively operating the actuator.

BRIEF DESCRIPTION OF THE DRAWINGS

Further objects and other advantages of the invention will become apparent from the following description in conjunction with the attached drawings, in which.

DETAILED DESCRIPTION OF THE PREFERRED EMBODIMENTS

Figure 1:
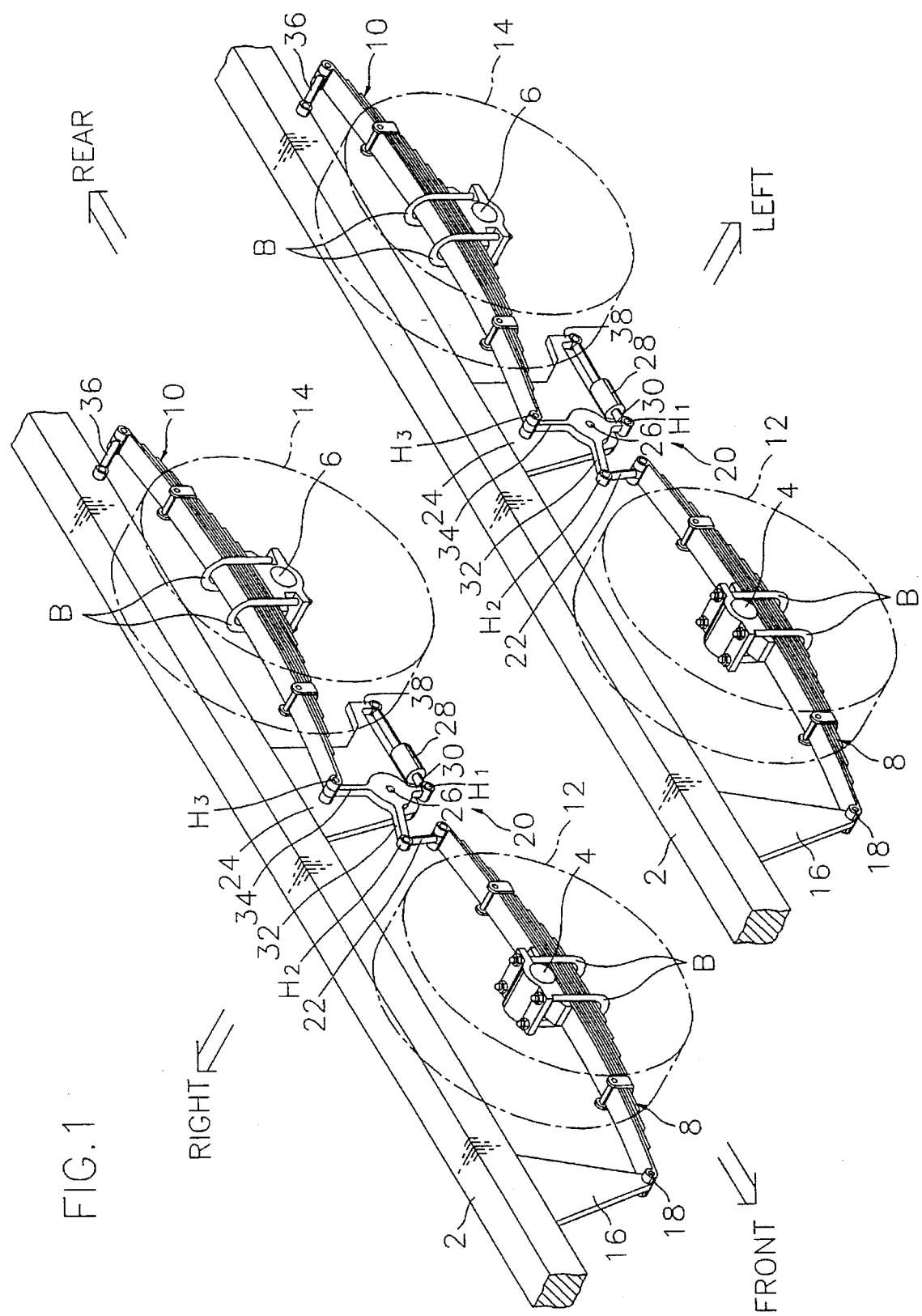
FIG. 1 is a perspective view of a rear wheel self steering system in accordance with a first embodiment of the present invention.
Figure 2:
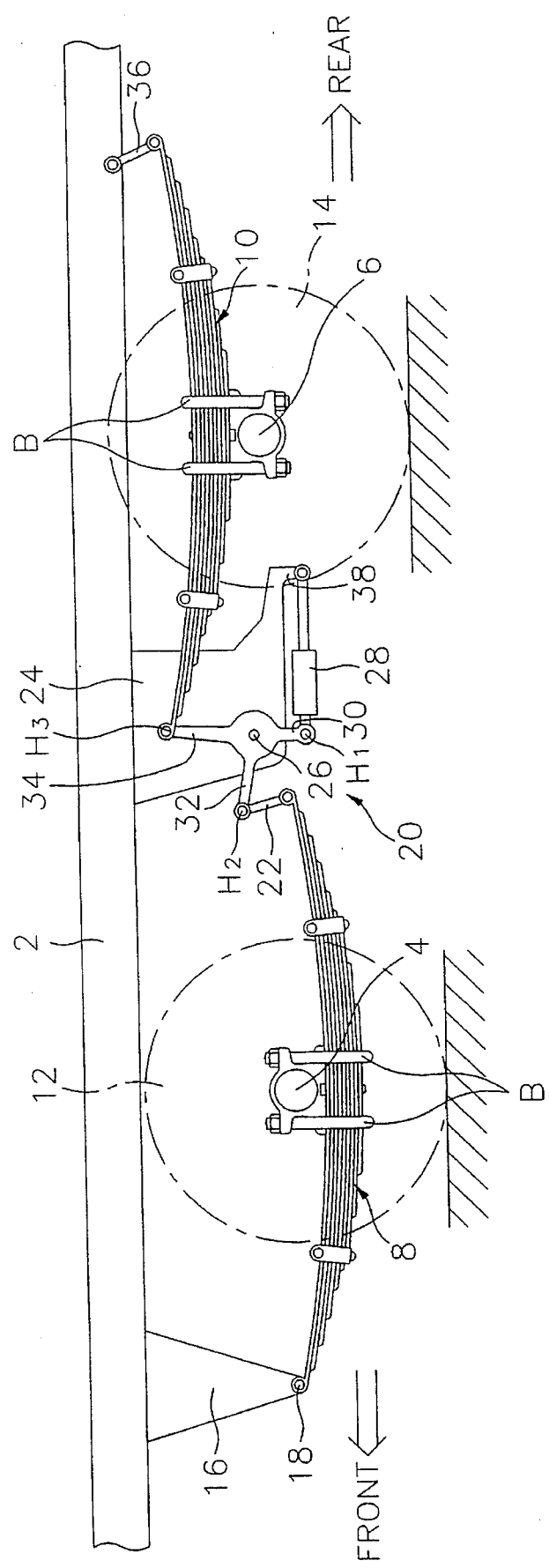
FIG. 2 is a side view of a rear wheel self steering system in accordance with the first embodiment of the present invention.

FIGS. 1 and 2 respectively show a perspective view and side view of a rear wheel self-steering system in accordance with a first embodiment of the present invention. In this embodiment, the systems of left and right sides of the vehicle are same as each other so only one side will be described hereinafter. The reference numeral 2 indicates a side frame for supporting a vehicle body.

The side frame 2 is designed to support a load-carrying platform (not shown).

First and second rear wheel axles 4 and 6 are located below the side frame 2. The first and second axles 4 and 6 are supported by first and second leaf spring groups 8 and 10, respectively, which are arcuate to absorb a shock which is transmitted from a road to first and second rear wheels 12 and 14.

A front end of the first spring group 8 is fixed by a pin 18 to a bracket 16 mounted on the side frame 2 and a rear end of the first spring group 8 is fixed to a steering member 20 by a link 22.

The first and second spring groups 8 and 10 are respectively connected to the first and second axles 4 and 6 by well known U-bolts B.

The steering member 20 is rotatably connected by a pin 26 to the bracket 24 mounted on the side frame 2. The steering member 20 includes a first arm 30 connected to an actuator 28, a second arm 32 connected to the link of the first leaf spring group 8, and a third arm 34 connected to the second leaf spring group 10.

The first, second and third arms 30, 32 and 34 have respective hinge points H1, H2 and H3 formed on their respective front ends.

When the vehicle is in a straight ahead position, the first and third arms 30 and 34 are displaced to be vertical to the vehicle body and an upper portion of the link 22 connecting the first leaf spring group 8 to the second arm 32 is declined to the front side when viewed from FIG. 2.

This structure is to prevent the first leaf spring group 8 from being affected when the steering member 20 rotates in the clockwise direction.

A rear end of the second leaf spring group 10 is connected to the side frame 2 through a shackle 36 to absorb the displacement occurring when the second leaf spring group 10 receives moving force rearward by the steering member 20.

The bracket 24 has a fixed end portion which projects downward and is connected to the actuator 28 such that the actuator 28 disposed between the first arm 30 of the steering member 20 and the bracket 24 can keep its longitudinal position.

Figure 3:
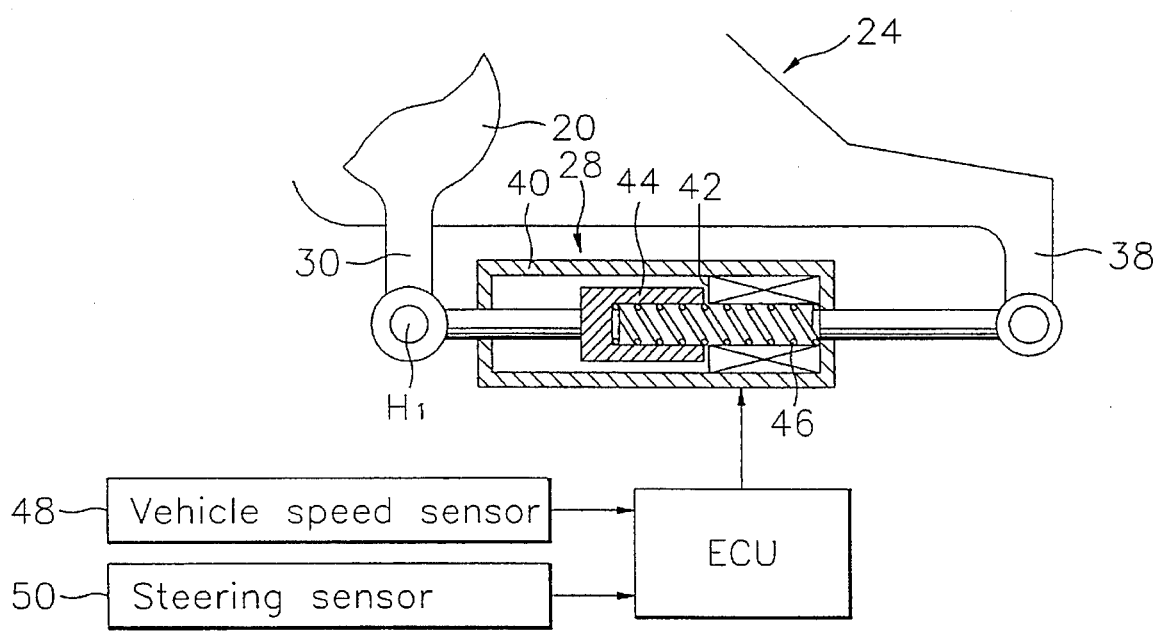
FIG. 3 is a view illustrating a control example of an actuator in accordance with the first embodiment of the present invention.

That is, the actuator 28 is, as shown in FIG. 3, mounted between the steering member 20 and the fixed end portion 38 of the bracket 24. The actuator 28 operates along its length to rotate the steering member 20 in the clockwise direction.

The actuator 28 has a structure such that a coil 42 electrically connected to an electronic control unit ECU is disposed in a casing 40 and a plunger 44 is disposed on the left side of the coil in the casing 40 and elastically supported by a spring 46.

The structure of the actuator may not be limited to the structure described above. Any structure which can move by magnetic force may be used.

The plunger 44 moves rightward in the drawing when the magnetic force is formed on the coil by an electrical signal transmitted from the ECU. The ECU receives a signal from a vehicle speed sensor 48 and a steering sensor 50 and excites the coil 42 when the vehicle speed is lower than a predetermined vehicle speed, for example below 40 Km/H.

In the above described rear wheel self-steering system, when the vehicle is in a turn, the vehicle body is lifted on the inside of the turn and is lowered on the outside of the turn.

As a result, the vehicle body on the outside of the turn is closer to the axle and the vehicle body on the inside of the turn becomes far away from the axle. At this state the first leaf spring group 8 on the outside of the turn is displaced into a flat state from the curvature state.

The force occurring by the change of the length of the first leaf spring group 8 is transmitted to the steering member 20 to rotate the steering member.

At this point, since the first arm 30 of the steering member 20 is connected to the actuator 28, if the actuator is in an expandable state, that is, an OFF state, the steering member 20 can rotate. However, if the actuator is not in an expandable state, that is, an ON state, the steering member 20 cannot rotate.

Accordingly, the actuator 28 is designed to be switched OFF when the vehicle speed is to be lower than the preset vehicle speed, that is, below 40 Km/H.

That is, when the actuator 28 is switched ON, the plunger 44 maintains its position on the right side, and turned OFF, the force which pulls the plunger rightward disappears.

Accordingly, when the steering signal is transmitted to the ECU at a low vehicle speed, the ECU controls the actuator 28 to be switched OFF. As a result, the expanding force of the first leaf spring group 8 pushes the second arm 32 such that the steering member 20 rotates in the clockwise direction about the pin 26 when viewed from FIG. 2.

Accordingly, the rotating member 20 rotates in the clockwise direction and, at this point, the link 22 integrally connected with the second arm 32 is pulled by the second arm 32.

However, since the lower end of the link 22 is disposed on the right side and the upper end of the link 22 is disposed on the left side, the link 22 is to be vertically set when the second arm 32 pulls the link 22.

Accordingly, the first leaf spring group 8 does not move but the second leaf spring group 10 connected to the third arm 34 receives a rearward force.

This force is transmitted to the second leaf spring group 10 to push the second leaf spring group 10 rearward. The second rear wheel axle 6 mounted on the second leaf spring group 10 by means of the U-bolt B also moves rearward.

Figure 4A:
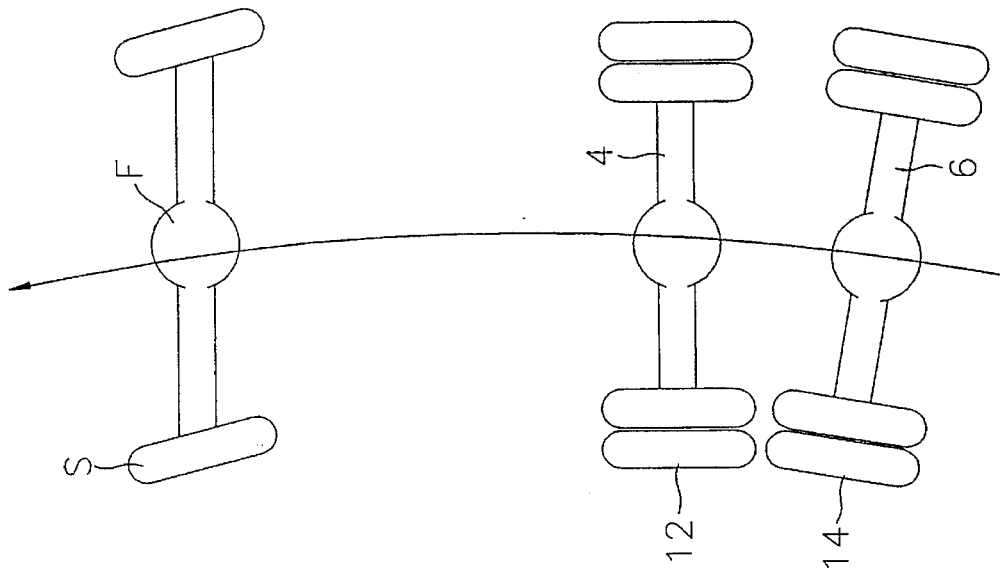
FIG. 4A is a view illustrating a steering operation of a conventional art.
Figure 4B:
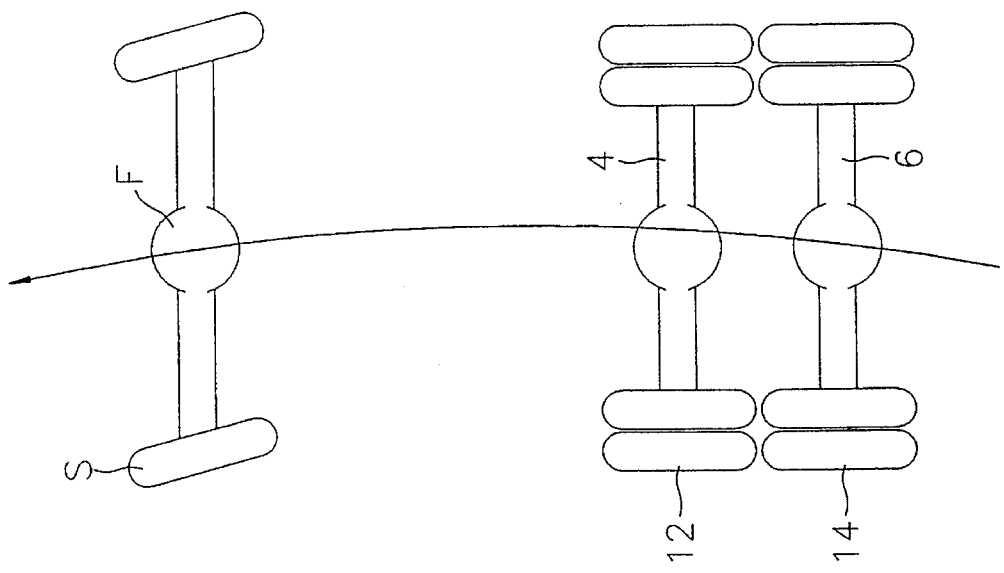
FIG. 4B is a view illustrating a steering operation of the self steering system in accordance with the first embodiment of the present invention.

This operation is achieved by a steering means of the outside of the turn. Accordingly, as shown in FIG. 4B, the second rear wheel axle 6 on the outer side of the turn moves rearward to be far away from the first rear wheel axle 4.

Accordingly, front wheels S turn to the left in a state where a front wheel axle F is parallel to the first rear wheel axle 4 and, at the same time, the second rear wheel axle 6 turns to the left in a state where the second rear wheels 14 do not turn to the left. FIG. 4A shows a steering state of a conventional commercial vehicle.

As described above, since the rear wheels turn by themselves, when the vehicle is in the turn, the adhesion force between the tire and the ground is reduced to minimize the tire wear and the cornering radius can be reduced.

Figure 5:
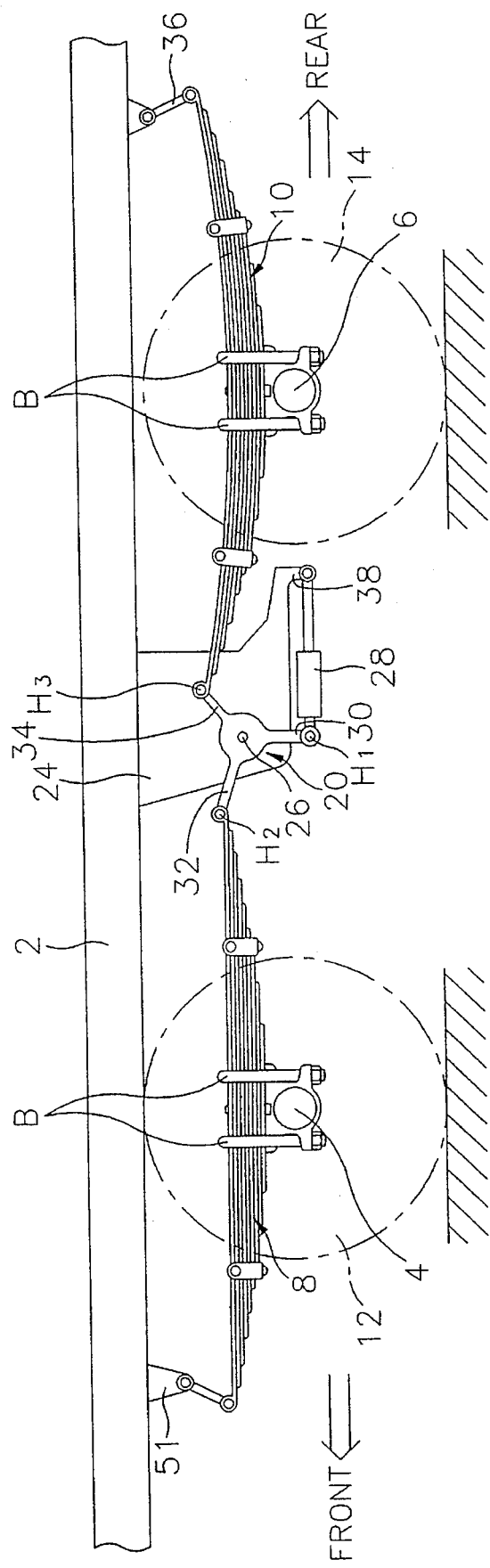
FIG. 5 is a side view of the rear wheel self steering system in accordance with a second embodiment of the present invention.

FIG. 5 shows a rear wheel self steering system in accordance with a second embodiment of the present invention. In this embodiment, the same elements as those in the previously described embodiment are designated by the same reference numerals.

In the rear wheel self-steering system of the second embodiment, the front end of the first leaf spring group 8 is connected to the side frame 2 by means of a shackle 51 and the first rear wheel axle 4 is fixed to the lower side of the first leaf spring group 8 by means of the U-bolt B.

The rear end of the first leaf spring group 8 is directly connected with the steering member 20.

The steering member 20 includes the first arm 30 connected with the actuator 28, the second arm 32 connected with the first leaf spring group 8, and the third arm 34 connected with the second leaf spring group 10.

The third arm 34 is connected to the second leaf spring group 10 in a manner similar to the first embodiment.

The actuator 28 includes a cylinder 52 having a two ports P1 and P2 and a piston 54 located within the cylinder 52 and connected to the steering member 20.

Figure 6:
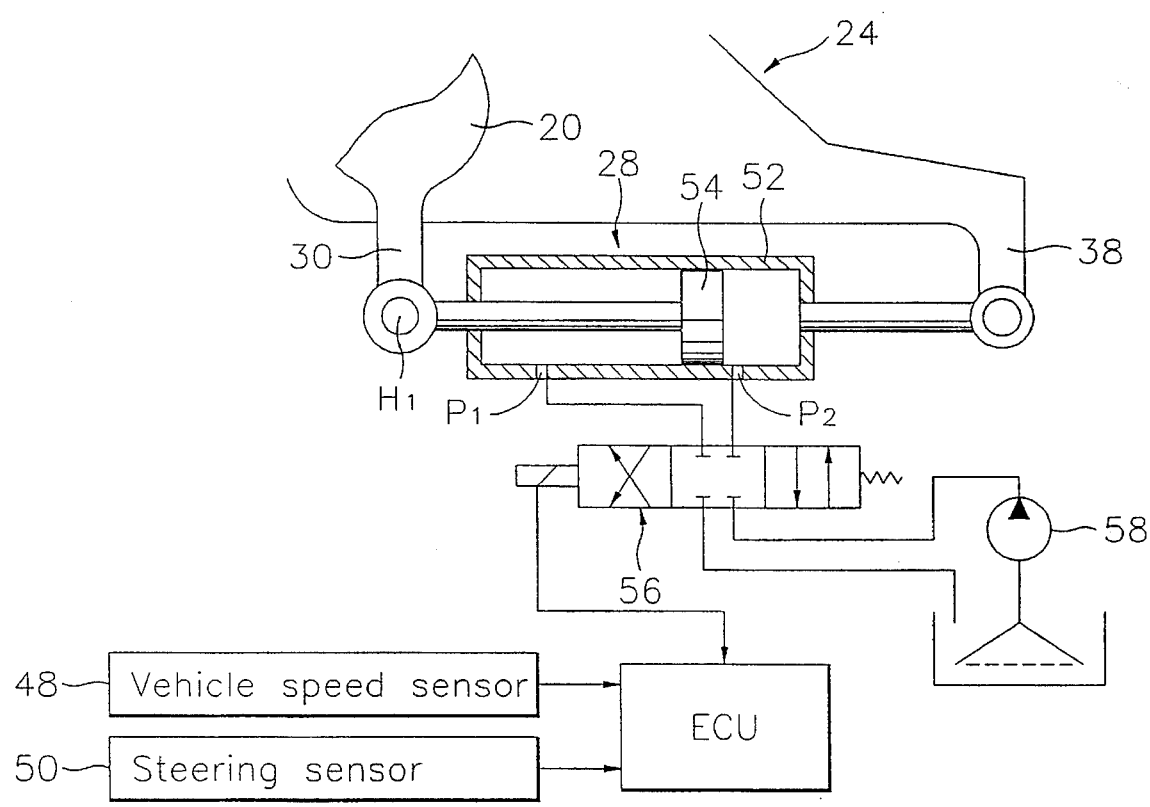
FIG. 6 is a view illustrating a control example of an actuator in accordance with the second embodiment of the present invention.

The cylinder 52 operates forward and rearward by the ECU which receives a signal from the vehicle speed sensor 48 and steering sensor 50. This operation is achieved by changing the flow direction of the hydraulic pressure. The flow direction of the hydraulic pressure is changed by a direction control valve 56 controlled by the ECU (See FIG. 6).

That is, the direction control valve 56 changes the flow direction of the hydraulic pressure to supply the hydraulic pressure to one of the two ports P1 and P2.

In the self-steering system according to the second embodiment of the present invention, since the first leaf spring group 8 is flat while the first leaf spring group 8 of the first embodiment is a curvature, the self-steering cannot be accomplished by the elastic force of the first leaf spring group.

Accordingly, in the second embodiment, when the hydraulic pressure generated from the oil pump 58 flows into the left port P1 by the control of the direction control valve 56, the piston 54 is moved rightward to dispose the steering member in an initial position, and when the hydraulic pressure flows into the right port P2, the piston 54 is moved leftward to rotate the steering member and accomplish the self-steering as described in the first embodiment.

Although preferred embodiments of the present invention have been described in detail hereinabove, it should be clearly understood that many variations and/or modifications of the basic inventive concepts herein taught which may appear to those skilled in the pertinent art will still fall within the spirit and scope of the present invention, as defined in the appended claims.

What is claimed is:

1. A rear wheel self-steering system for a vehicle, comprising:

a side frame;

a first spring member mounted on a first rear wheel axle below the side frame and having a front end fixed to the side frame;

a second spring member mounted on a second rear wheel axle below the side frame and having a rear end fixed to the side frame; and steering control means, longitudinally positioned between and connected to said first and second spring members, for controlling a distance between the first and second rear wheel axles in accordance with a vehicle's driving condition such that when the vehicle is in a turn the first rear wheel axle is further spaced from the second rear wheel axle.

2. The rear wheel self-steering system of claim 1, wherein said steering control means comprises:

a steering member, to which a rear end of the first spring member and a front end of the second spring member are connected, for receiving an expanding force of the first and second spring members which occurs when a vehicle body on an outer side of a turn is lowered during cornering, said steering member being rotatably fixed to a bracket mounted on said side frame;

an actuator for controlling a rotation of said steering member in accordance with the vehicle's driving condition; and an electronic control unit for receiving a signal from a vehicle speed sensor and a steering sensor and outputting an electric signal for selectively operating the actuator.

3. The rear wheel self-steering system of claim 2, wherein said actuator includes a solenoid coil which excites by receiving the electric signal from said electronic control unit.

4. The rear wheel self-steering system of claim 2, wherein said actuator is a double acting cylinder having two hydraulic ports.

5. The rear wheel self-steering system of claim 1, wherein said first spring member is disposed above said first rear wheel axle.

6. The rear wheel self-steering system of claim 1, wherein the front end of said first spring member is disposed below said first rear wheel axle.

7. The rear wheel self-steering system of claim 1, wherein a front end of said first spring member is fixed to said side frame by a shackle.

8. The rear wheel self-steering system of claim 1, wherein at least one of said first and second spring members is made of a leaf spring group.

9. The rear wheel self-steering system of claim 2, wherein said steering member is controlled to be rotated below 40 Km/h.

10. A rear wheel self-steering system for a vehicle, comprising:

a side frame;

a first spring member mounted on a first rear wheel axle below said side frame and having a front end fixed to said side frame;

a second spring member mounted on a second rear wheel axle below said side frame and having a rear end fixed to said side frame; and steering control means for controlling a distance between the first and second rear wheel axles in accordance with a vehicle's driving condition such that when the vehicle is in a turn the first rear wheel axle becomes far away from the second rear wheel axle, said steering control means connecting said first and second spring members to each other and wherein said steering control means includes a steering member, to which a rear end of said first spring member and a front end of said second spring member are connected, for receiving an expanding force of said first and second spring members which occurs when a vehicle body on an outer side of a turn lowers during cornering, said steering member being rotatably fixed to a bracket mounted on said side frame, an actuator for controlling a rotation of said steering member in accordance with the vehicle's driving condition, and an electronic control unit for receiving a signal from a vehicle speed sensor and a steering sensor and outputting an electric signal for selectively operating said actuator.

11. The rear wheel self-steering system of claim 10, wherein said actuator includes a solenoid coil which excites by receiving the electric signal from said electronic control unit.

12. The rear wheel self-steering system of claim 10, wherein said actuator is a double acting cylinder having two hydraulic ports.

13. The rear wheel self-steering system of claim 10, wherein said first spring member is disposed above said first rear wheel axle.

14. The rear wheel self-steering system of claim 10, wherein the front end of said first spring member is disposed below said first rear wheel axle.

15. The rear wheel self-steering system of claim 10, wherein a front end of said first spring member is fixed to said side frame by a shackle.

16. The rear wheel self-steering system of claim 10, wherein at least one of said first and second spring members is made of a leaf spring group.

17. The rear wheel self-steering system of claim 10, wherein said steering member is controlled to be rotated below 40 Km/h.

* * * * *